United States Patent
Singer et al.

(10) Patent No.: US 10,230,959 B2
(45) Date of Patent: Mar. 12, 2019

(54) METHOD AND APPARATUS FOR PERFORMING COMPRESSION OF IMAGE DATA

(75) Inventors: Stefan Singer, Vaterstetten (DE); Jochen Gerster, Stuttgart (DE); Stephan Herrmann, Markt Schwaben (DE); Albrecht Neff, Munich (DE)

(73) Assignee: NXP USA, Inc., Austin, TX (US)

( * ) Notice: Subject to any disclaimer, the term of this patent is extended or adjusted under 35 U.S.C. 154(b) by 310 days.

(21) Appl. No.: 14/401,151

(22) PCT Filed: Jun. 1, 2012

(86) PCT No.: PCT/IB2012/052784
§ 371 (c)(1),
(2), (4) Date: Nov. 14, 2014

(87) PCT Pub. No.: WO2013/179101
PCT Pub. Date: Dec. 5, 2013

(65) Prior Publication Data
US 2015/0163496 A1 Jun. 11, 2015

(51) Int. Cl.
*H04N 19/152* (2014.01)
*H04N 19/115* (2014.01)
(Continued)

(52) U.S. Cl.
CPC ......... *H04N 19/152* (2014.11); *H04N 19/115* (2014.11); *H04N 19/172* (2014.11); *H04N 19/176* (2014.11)

(58) Field of Classification Search
CPC ............ H04N 21/2383; H04N 19/154; H04N 19/176; H04N 19/132; H04N 21/23424;
(Continued)

(56) References Cited

U.S. PATENT DOCUMENTS

| | | | | |
|---|---|---|---|---|
| 4,499,502 A | * | 2/1985 | Dakin | H04N 9/797 348/470 |
| 6,195,462 B1 | * | 2/2001 | Bryniarski | G06T 9/00 345/43 |

(Continued)

FOREIGN PATENT DOCUMENTS

| | | |
|---|---|---|
| CN | 1849826 A | 10/2006 |
| CN | 102215199 A | 10/2011 |
| EP | 2073555 A2 | 6/2009 |

OTHER PUBLICATIONS

International Search Report and Written Opinion correlating to PCT/IB2012/052784 dated Dec. 27, 2012.

*Primary Examiner* — Dave Czekaj
*Assistant Examiner* — Kehinde Arimbola (57) ABSTRACT

A method of performing compression of image data for at least one image is described. The method comprises receiving image data of at least a part of the at least one image, encoding the received image data into at least one compressed data block, applying at least one bandwidth limit to the at least one compressed data block, and outputting the at least one bandwidth limited compressed data block to a buffer. The method further comprises dynamically updating the at least one bandwidth limit applied to the at least one compressed data block base at least partly on a fill level of the buffer.

16 Claims, 3 Drawing Sheets

(51) Int. Cl.
*H04N 19/172* (2014.01)
*H04N 19/176* (2014.01)

(58) Field of Classification Search
CPC .......... H04N 21/2353; H04N 21/2662; H04N 21/6125; H04N 19/186; H04N 19/61; H04N 19/85; H04N 21/4347; H04N 21/23611; H04N 21/2365; H04N 21/242; H04N 21/812; H04N 21/2347; H04N 21/23608; H04N 21/4325; H04N 21/435; H04N 21/222; H04N 21/23406; H04N 21/234345; H04N 21/2401; H04N 19/115; H04N 19/102; H04N 19/12; H04N 19/129; H04N 19/13; H04N 19/146; H04N 19/15; H04N 19/162; H04N 19/167; H04N 19/36; H04N 19/42
See application file for complete search history.

(56) References Cited

U.S. PATENT DOCUMENTS

| | | | | |
|---|---|---|---|---|
| 7,444,030 B2* | 10/2008 | Reid | ...................... | H04N 19/60 375/E7.026 |
| 8,152,312 B2* | 4/2012 | Kondo | ................. | H04N 9/3147 345/1.1 |
| 8,165,204 B2 | 4/2012 | Bronstein et al. | | |
| 8,345,753 B2* | 1/2013 | Lee | ...................... | H04N 19/90 375/240.01 |
| 2005/0031219 A1* | 2/2005 | Puri | ...................... | H04N 19/46 382/250 |
| 2005/0210151 A1* | 9/2005 | Abdo | ...................... | H03M 7/30 709/247 |
| 2006/0104524 A1* | 5/2006 | Reid | ...................... | H04N 19/60 382/239 |
| 2006/0274830 A1 | 12/2006 | Koto | | |
| 2007/0116369 A1* | 5/2007 | Zandi | .................... | G06F 17/148 382/240 |
| 2007/0211225 A1* | 9/2007 | Kondo | ................. | H04N 9/3147 353/94 |
| 2008/0131087 A1* | 6/2008 | Lee | ...................... | H04N 19/593 386/326 |
| 2009/0010325 A1 | 1/2009 | Nie et al. | | |
| 2009/0060370 A1 | 3/2009 | Pedersen | | |
| 2010/0104021 A1 | 4/2010 | Schmit | | |
| 2010/0124275 A1* | 5/2010 | Yeh | .................. | H04N 21/44209 375/240.07 |
| 2010/0128996 A1 | 5/2010 | Lee | | |
| 2010/0232721 A1* | 9/2010 | Yang | .................... | H04N 19/172 382/239 |
| 2010/0278230 A1* | 11/2010 | MacInnis | ............. | H04N 19/172 375/240.02 |
| 2011/0099295 A1 | 4/2011 | Wegener | | |
| 2011/0314231 A1* | 12/2011 | O'Connor | ............. | G06F 13/161 711/154 |
| 2013/0251261 A1* | 9/2013 | Blum | ........................ | G06T 9/00 382/176 |

* cited by examiner

METHOD AND APPARATUS FOR PERFORMING COMPRESSION OF IMAGE DATA

FIELD OF THE INVENTION

The field of this invention relates to a method and apparatus for performing compression of image data.

BACKGROUND OF THE INVENTION

Conventionally, latency sensitive video applications, for example such as automotive driver assistance camera applications, use uncompressed video streams in order to avoid the introduction of latency inherent in conventional compression techniques. Such latency introduced during conventional compression techniques is due to a large part on the need to buffer large amounts of image data during the encoding process.

However, the use of uncompressed video streams typically results in very high bandwidth transmissions, which in turn introduces several challenges. For example, higher bandwidth transmission schemes (e.g. shielded wiring) will typically require more expensive wiring solutions in order to provide sufficient bandwidth). Too low a bandwidth would result in image degradation, e.g. data being 'truncated' producing artefacts in a subsequently displayed image.

SUMMARY OF THE INVENTION

The present invention provides a method of performing compression of image data for at least one image, an encoding module arranged to perform compression of image data for at least one image and a video system comprising such an encoding module as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

The present invention will now be described with reference to the accompanying drawings in which examples of a method and apparatus for performing compression of image data for at least one image are disclosed. In particular, an example of a video streaming system comprising an encoder module arranged to perform a method of performing compression of image data for at least one image is illustrated and described. In some examples, the encoder module described herein may be implemented in hardware, for example implemented within an integrated circuit device comprising at least one die within a single integrated circuit package. Because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 1:
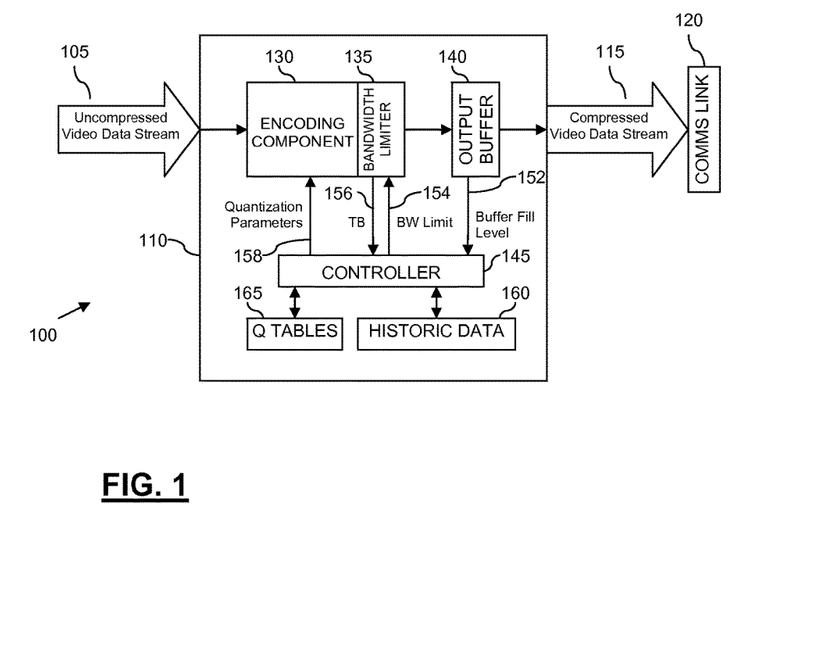
FIG. 1 illustrates a simplified block diagram of an example of a part of a video streaming system.

Referring first to FIG. 1, there is illustrated a simplified block diagram of an example of a part of a video streaming system 100, for example such as a video streaming system being arranged to be implemented within an automotive driver assistance camera application, or other such latency sensitive video application. The video streaming system 100 comprises an encoder module 110 arranged to receive uncompressed image data, which in the illustrated example is in the form of an uncompressed video data stream 105, to perform compression of the received image data, and to output the compressed image data. In the illustrated example, the encoder module 110 is arranged to output the compressed image data in the form of a compressed video data stream 115 for transmission over a communications channel 120.

The encoder module 110 comprises an encoding component 130 arranged to receive image data, and to encode the received image data into compressed data blocks; a single image, or frame, being encoded into multiple compressed data blocks, for example 8×8 or 16×16 pixel macro blocks. The encoder module 110 further comprises a bandwidth limiter component 135 arranged to apply a bandwidth limit to each compressed data block, and to output the bandwidth limited compressed data blocks to a buffer 140. In this manner, the size of individual compressed data blocks may be limited, for example to prevent buffer overflow. The encoder module 110 further comprises a controller component 145 arranged to dynamically update the bandwidth limit applied by the bandwidth limiter component 135 to compressed data blocks based at least partly on a fill level of the buffer 140. In this manner, and as described in greater detail below, by enabling the bandwidth limit to be dynamically updated, the aggressiveness with which compressed data blocks are bandwidth limited may be dynamically varied depending on the fill level of the buffer 140.

For example, if the buffer 140 comprises a relatively low fill level, the bandwidth limit applied to the compressed data blocks may be set to a relatively large size limit. In this manner, the likelihood of bits being truncated from the compressed data blocks is reduced. Conversely, if the buffer 140 comprises a relatively high fill level, the bandwidth limit applied to the compressed data blocks may be set to a relatively small size limit. In this manner, larger compressed data blocks may be truncated in order to avoid buffer overflow. Accordingly, whilst the fill level of the buffer 140 is relatively low, less aggressive bandwidth limiting of compressed data blocks may be implemented, thereby allowing greater throughput of data, and thus enabling greater image quality. Conversely, if the throughput of data is sufficiently high to cause the fill level of the buffer 140 to increase, the bandwidth limit may be reduced in order to reduce the throughput of data to avoid buffer overflow.

In conventional compression techniques, a bandwidth limit may be set at a fixed level which would inherently need to be a cautiously low level in order to prevent buffer overflow in predicted worst case (or near worst case) scenarios; such scenarios typically being a minority of cases, thereby resulting in such a fixed bandwidth limit being unnecessarily low for the majority of cases, and thereby being unnecessarily restrictive on the available throughput resulting in unnecessary truncation of bits from compressed data blocks. Advantageously, by dynamically updating the bandwidth limit applied to the compressed data blocks based on the buffer fill level in this manner, a more appropriate bandwidth limit may be set and dynamically updated as required based on the fill level of the buffer 140. As such, the encoder module 110 illustrated in FIG. 1 enables improved overall throughput to be achieved, thereby enabling improved image quality for a given buffer size and egress rate. Additionally and/or alternatively, the encoder module 110 enables a smaller buffer size (relative to conventional compression techniques) to be implemented to achieve a desired/required image quality.

Figure 2:
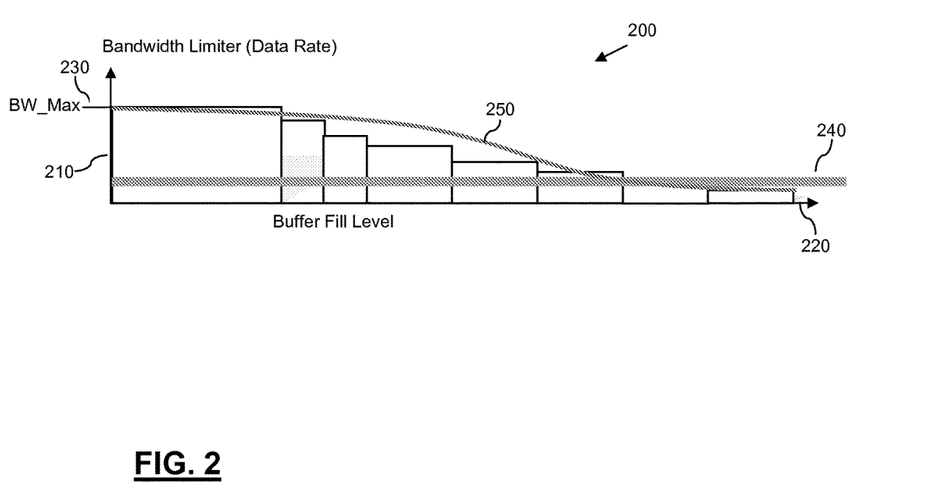
FIG. 2 illustrates a simplified graph showing an example of bandwidth limit versus buffer fill level.

In some examples, the controller component 145 may be arranged to dynamically update the bandwidth limit applied by the bandwidth limiter component 135 based at least partly on the fill level of the buffer 140 in any suitable manner. In the example illustrated in FIG. 1, the controller component 145 is arranged to receive an indication 152 of a fill level of the buffer 140, and to compare the fill level to one or more threshold values. If the indicated fill level of the buffer 140 exceeds (at least one of) the threshold value(s), the controller component 145 may be arranged to dynamically configure the bandwidth limiter 135 to apply a reduced bandwidth limit to compressed data blocks. For example, FIG. 2 illustrates a simplified graph 200 showing an example of bandwidth limit 220 versus buffer fill level 220 such as may be implemented within the encoder module 110.

The controller component 145 may be arranged to configure, for example at the start of an image/frame to be encoded, an initial bandwidth limit (BW_Max) 230. In some examples, the controller component 145 may be arranged to calculate an initial bandwidth limit (BW_Max) 230 to be applied to compressed data blocks for a current image based at least partly on a data rate for at least one previous image. For example, the controller component 145 may be arranged to calculate an initial bandwidth limit (BW_Max) 230 to be applied to compressed data blocks for a current image based at least partly on one or more of:

(i) a data rate distribution of compressed image data for N previous images, where N equals an integer value;
(ii) a distribution of truncated bits for N previous images; and
(iii) a compression factor (e.g. representative of an amount by which the image data is compressed) for N previous images.

As previously mentioned, the controller component 145 illustrated in FIG. 1 is arranged to receive an indication 152 of a fill level of the buffer 140 during the encoding of image data. In this manner, the controller component 145 is provided with an indication of a data rate for compressed image data, which the controller component 145 may store within a memory element 160. In the illustrated example, the controller component 145 is further arranged to receive an indication 156 of bits truncated from compressed data blocks by the bandwidth limiter 135, which the controller component 145 may also store within the memory element 160. As described in greater detail below, the controller component 145 may further store within the memory element 160 indications of compression factors for encoded images. In this manner, a data rate distribution of compressed image data, a distribution of truncated bits and/or a distribution of compression factors for the N previous images is available to the controller component 145 from the memory element 160, and on which the controller component 145 may calculate an initial bandwidth limit (BW_Max) 230 to be applied to compressed data blocks for a current image.

For example, upon receipt of (or just before receiving) a new image to be encoded (the 'current' image), the controller component 145 may retrieve parameters from the memory element 160 for the previous N images (where 'i'=1 to N) such as, by way of example:

data rate distribution of compressed image data: DV_comp_i_[ ]
distribution of truncated bits: TB_i_[ ]
distribution of compression factors: QF_i The controller component 145 may then combine the data rate distribution of compressed image data with the distribution of truncated bits to obtain a distribution of encoded data for the previous N images DV_i_[ ] (i.e. prior to being bandwidth limited):

$$DV\_i\_[\ ]=DV\_comp\_i\_[\ ]+TB\_i\_[\ ] \qquad \text{Eq. 1}$$

As described in greater detail below, the controller component 145 may be arranged to individually calculate a compression factor (QF) for each image to be encoded. Accordingly, the controller component 145 may be arranged to use the distribution of compression factors (QF_i) for previous images to normalise, or otherwise take into account different respective compression factors for, the distribution of encoded data DV_i_[ ].

In some examples, the controller component 145 may then low pass filter the distribution of encoded data for the previous N images to filter out individual high peaks to generate a low pass filtered distribution of encoded data for the previous N images: DV_low_i_[ ], which may then be used to calculate the initial bandwidth limit BW_Max 230 for the current image. For example, the initial bandwidth limit BW_Max 230 for the current image may be set equal to a maximum value within the low pass filtered distribution of encoded data for the previous N images DV_low_i_[ ]. Alternatively, the initial bandwidth limit BW_Max 230 for the current image may be set equal to an average value or the like within the low pass filtered distribution of encoded data for the previous N images DV_low_i_[ ]. The controller component 145 may then configure the bandwidth limiter 135 to apply the initial bandwidth limit BW_Max 230 to compressed data blocks for the current image, for example by providing the required bandwidth limit 154 thereto.

During encoding of the current image, the controller component 145 receives indications 152 of the fill level of the buffer 140, and may be arranged to dynamically reduce the bandwidth limit applied to compressed data blocks for the current image relative to the initial bandwidth limit BW_Max 230. For example one or more threshold levels may be configured based at least partly on, say, a size of the buffer 140, an egress rate of the buffer 140, and/or the initial bandwidth limit BW_Max 230 for the current image. In some examples, the controller component 145 may be arranged to dynamically reduce the bandwidth limit applied to compressed data blocks for the current image by an amount dependent at least partly on by how much the fill level of the buffer 140 exceeds the one or more threshold levels.

For example, and referring back to FIG. 2, a plurality of threshold levels may be configured. A reduced bandwidth limit may thus be configured for each threshold level such that the bandwidth limit becomes progressively reduced until it falls below an egress rate level 240 for the buffer 140; i.e. the bandwidth limit for the highest threshold level 240 is such that the data rate of bandwidth limited compressed data blocks received by the buffer 140 is less than the egress data rate of the buffer 140 (e.g. the data rate of the communications channel 120 in FIG. 1). In this manner, by comparing the current fill level of the buffer 140 to the various threshold values, if the fill level of the buffer 140 exceeds one or more of the threshold levels, the bandwidth limit may be reconfigured to the reduced bandwidth limit corresponding to the highest exceeded threshold level. Conversely, if the fill level of the buffer 140 remains, or drops, below all of the threshold levels, the bandwidth limit may be (re)configured to the initial bandwidth limit BW_Max 230 for the current image.

As can be seen in the example of FIG. 2, an initial bandwidth limit BW_Max 230 may be initially configured that is significantly higher than the egress rate of the buffer 140, with the bandwidth limit only being reduced in response to the fill level of the buffer (i.e. in accordance with the actual data rate of compressed data). In this manner, an unnecessarily cautious and low bandwidth limit is not required from the outset, enabling the throughput of the encoder module 110 to be substantially optimized, thereby enabling the achievable image quality to be substantially optimized with respect to the size of the buffer 140 and the data rate of the communications channel 120.

In the example described above with reference to FIG. 2, the bandwidth limit is dynamically configured based on the buffer fill level and discrete threshold levels. In some alternative examples, the bandwidth limit may be dynamically configured based on the buffer fill level and, say, a simple linear function, such as y=m*x+t, where:

y is the bandwidth limit, x represents available (empty) buffer space (e.g. buffer size−buffer fill level), t is a constant comprising a value less than an egress data rate of the buffer 140, and m is a constant configured to achieve the initial bandwidth limit BW_Max at a certain buffer fill level.

In this manner, the bandwidth limit may be dynamically configured in a more continuous manner, as illustrated by the curve 250 in FIG. 2. Alternatively, a more complex function may be used to dynamically configure the bandwidth limit additionally and/or alternatively based on, say, one or more of:

(i) a data rate distribution of compressed image data for N previous images, where N equals an integer value;

(ii) a distribution of truncated bits for N previous images; and (iii) a compression factor (e.g. representative of an amount by which the image data is compressed) for N previous images.

Referring back to FIG. 1, in some examples the controller component 145 may further be arranged to calculate a compression factor (as described in greater detail below) for encoding received image data of a current image into compressed data blocks based at least partly on a data rate for at least one previous image, and to configure 158 the encoding component 130 to encode received image data into compressed data blocks in accordance with the calculated compression factor. For example, the controller component 145 may be arranged to calculate a compression factor for encoding received image data of a current image into compressed data blocks based at least partly on one or more of:

(i) a data rate distribution of compressed image data for N previous images, where N equals an integer value;

(ii) a distribution of truncated bits for N previous images; and (iii) a compression factor for N previous images.

For example, as previously mentioned, upon receipt of (or just before receiving) a new image to be encoded (the 'current' image), the controller component 145 may retrieve the following parameters from the memory element 160 for the previous N images (where 'i'=1 to N):

data rate distribution of compressed image data: DV_comp_i_[ ]

distribution of truncated bits: TB_i_[ ]

distribution of compression factors: QF_i

The controller component 145 may then combine the data rate distribution of compressed image data with the distribution of truncated bits to obtain a distribution of encoded data for the previous N images DV_i_[ ] (i.e. prior to being bandwidth limited):

$$DV\_i\_[\ ]=DV\_comp\_i\_[\ ]+TB\_i\_[\ ] \qquad \text{Eq. 1}$$

The controller component 145 may be arranged to use the distribution of compression factors (QF_i) to normalise, or otherwise take into account different respective compression factors for, the distribution of encoded data DV_i_[ ].

In some examples, the controller component 145 may then low pass filter the distribution of encoded data for the previous N images to filter out individual high peaks to generate a low pass filtered distribution of encoded data for the previous N images: DV_low_i_[ ], which may then be used to calculate the initial bandwidth limit BW_Max 230 for the current image. This low pass filtered distribution of encoded data for the previous N images DV_low_i_[ ] may also be used to determine an optimal compression factor (QF) for the current image.

For example, an optimal average data rate for compressed data blocks output by the encoding component 130 may be determined based on an egress rate of the buffer 140 (e.g. based on the data rate of the communications channel 120), and on the size of the buffer 140. Such an optimal average data rate may be determined to achieve, say, a substantially maximum data rate which results in a minimal level of bit truncation of compressed data blocks by the bandwidth limiter component 135.

The controller component 145 may also calculate an average data rate for the received image data (e.g. received via the uncompressed video data stream) of the previous N images based on, say, the low pass filtered distribution of encoded data for the previous N images DV_low_i_[ ] and the distribution of compression factors QF_i therefor.

The controller component 145 may then calculate a compression factor for the current image based on an optimal compression factor for achieving the optimal average data rate for compressed data blocks output by the encoding component 130 from the calculated average data rate for the received image data of the previous N images. In this manner, the controller component 145 may be arranged to use the historic data of the previous N images to calculate an optimal compression factor for achieving a substantially maximum data rate (and thus a maximum image quality) which results in a minimal level of bit truncation of compressed data blocks by the bandwidth limiter component 135.

In the example illustrated in FIG. 1, the calculated compensation factor for the current image is used to determine one or more quantization parameters 158 provided to the encoding component 130 in order to configure the encoding component to perform the required compression of image data. For example, and as illustrated in FIG. 1, the controller component 145 may be arranged to retrieve appropriate quantization parameters for the calculated compensation factor from one or more quantization tables stored in a memory element 165, and to provide the retrieved quantization parameters to the encoding component 130.

In some examples, the bandwidth limiter component 135 may be arranged to apply separate bandwidth limits to different components of the image data within each block of compressed data. For example, in the case of JPEG (Joint Photographic Experts Group) compression, the colours in the image data are converted to one luma (Y) component representing brightness and two chroma (U and V) components representing colour. The luma and chroma components are typically encoded in parallel, but separately, within the encoding component 130. Accordingly, the bandwidth limiter component 135 may be arranged to apply separate bandwidth limits to the luma and chroma image components of the image data. In this manner, because the luma component has more significance for object detection during the decoding of the compressed image data, implementing a more aggressive bandwidth limit for the chroma component in order to allow a less aggressive bandwidth for the luma component enables improved object detection at a receiver.

Thus, an encoding module 110 has been described that enables the compression of video data for transmission over bandwidth limited communications channel, with low latency and without the need for a large output buffer, whilst also improving image quality as compared with conventional compression techniques.

Figure 3:
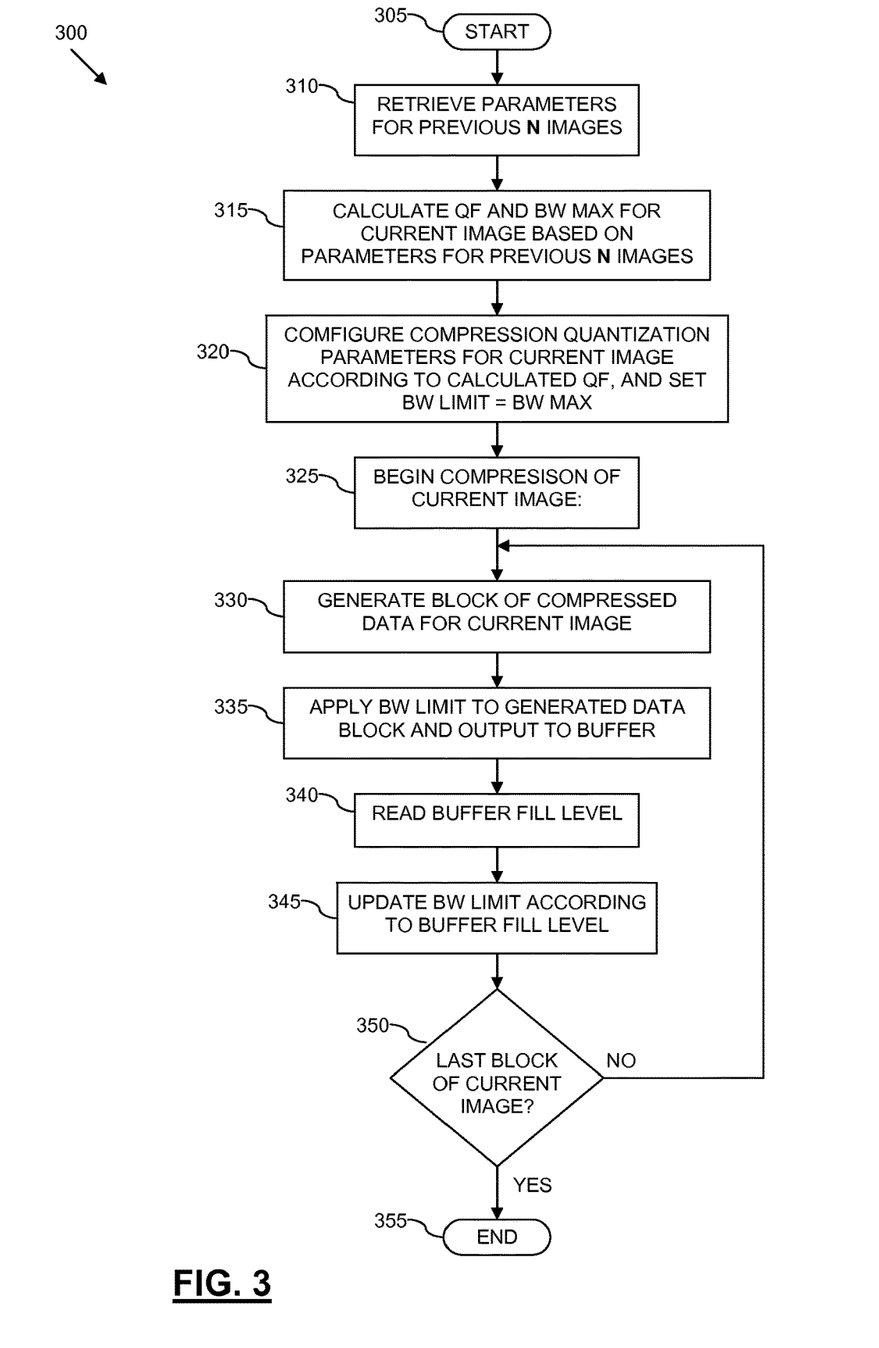
FIGS. 3 and 4 illustrate simplified flowcharts of an example of a method of performing compression of image data.
Figure 4:
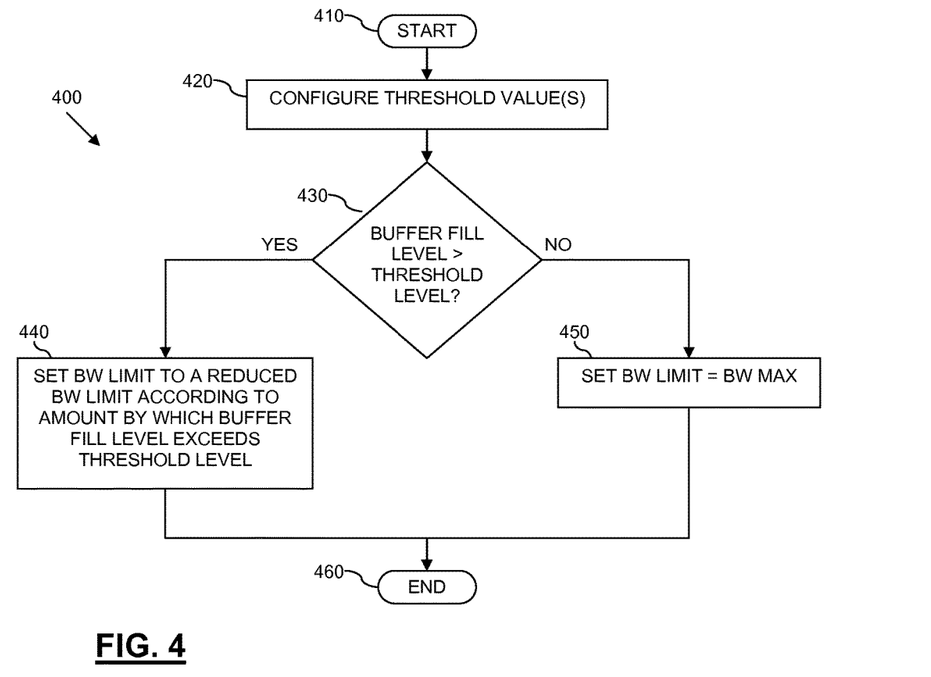

Referring now to FIGS. 3 and 4, there are illustrated simplified flowcharts 300, 400 of an example of a method of performing compression of image data for at least one (current) image, such as may be implemented by the encoding module 110 of FIG. 1. The method starts at 305, and moves on to 310 where parameters for N previous images are retrieved. For example, such parameters may comprise, say, one or more of:
  (i) a data rate distribution of compressed image data for N previous images;
  (ii) a distribution of truncated bits for N previous images; and
  (iii) a compression factor (e.g. representative of an amount by which the image data is compressed) for N previous images.

Next, at 315, a compression factor (QF) and initial bandwidth limit (BW_Max) for the current image are calculated based (at least partly) on the retrieved parameters for N previous images. Quantization parameters for the current image are then configured according to the calculated compression factor, and a bandwidth limit to (initially) be applied to compressed image data blocks for the current image is set to the initial bandwidth limit, at 320. The method then moves on to 325, where compression of image data for the current image begins. A block of compressed data for the current image, for example an 8×8 or 16×16 pixel macro block, is generated, at 330. The configured bandwidth limit is applied to the compressed data block, and the bandwidth limited compressed data block is output to a buffer at 335. A buffer fill level is then read, at 340, and the bandwidth limit is updated according to the buffer fill level at 345, for example as described in greater detail with reference to FIG. 4 below. If, at 350, the last compressed data block for the current image has been output to the buffer, the method ends at 355. Conversely, if the data for the current image comprises more blocks of data, the method loops back to 330 where the next block of compressed data for the current image is generated.

Referring now to FIG. 4, there is illustrated a simplified flowchart 400 of a part of the method comprising an example of updating the bandwidth limit to be applied to the blocks of compressed image data. This part of the method starts at 410, and moves on to 420 where one or more threshold values are configured. Next, at 430, a buffer fill level is compared to the (or each) threshold level. If the buffer fill level exceeds one or more of the threshold level(s), the method moves on to 440, where the bandwidth limit to be applied to compressed data blocks for the current image is set to a reduced bandwidth limit (relative to the initial bandwidth limit) by an amount dependent at least partly on by how much the fill level of the buffer exceeds the one or more threshold levels. Conversely, if the buffer fill level does not exceed the threshold level(s), the method moves on to 450 where the bandwidth limit to be applied to compressed data blocks for the current image is set to the initial bandwidth limit. This part of the method then ends, at 460.

In some alternative examples, the bandwidth limit may be dynamically configured based on the buffer fill level and, say, a simple linear function, such as y=m*x+t, where:
  y is the bandwidth limit,
  x represents available (empty) buffer space (e.g. buffer size−buffer fill level),
  t is a constant comprising a value less than an egress data rate of the buffer 140, and
  m is a constant configured to achieve the initial bandwidth limit BW_Max at a certain buffer fill level.

In this manner, the bandwidth limit may be dynamically configured in a more continuous manner, as illustrated by the curve 250 in FIG. 2. Alternatively, a more complex function may be used to dynamically configure the bandwidth limit additionally and/or alternatively based on, say, one or more of:
  (i) a data rate distribution of compressed image data for N previous images, where N equals an integer value;
  (ii) a distribution of truncated bits for N previous images; and
  (iii) a compression factor (e.g. representative of an amount by which the image data is compressed) for N previous images In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the controller component 145 has been illustrated for clarity as comprising a separate functional component to the encoding component 130 and the bandwidth limiter component 135. However, it will be appreciated that the controller component 145 may equally be implemented as an integral part of the encoding component 130. Additionally and/or alternatively, the bandwidth limiter component 135 has been illustrated in FIG. 1 as comprising a substantially integral part of the encoding component 130. However, it is contemplated that the bandwidth limiter component 135 may equally be implemented as a separate, discrete component. Furthermore, for clarity the quantization tables and historic data comprising parameters for previous images have been illustrated in FIG. 1 as being stored within separate memory elements 160, 165. However, it will be appreciated that the quantization tables and historic data may equally be stored within a single memory element.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected', or 'operably coupled', to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an', as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an'. The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of performing compression of image data for a current image of a video data stream, the method comprising:
   receiving image data of at least part of the current image;
   encoding the received image data into at least one compressed data block in accordance with a compression factor;
   applying at least one bandwidth limit to the at least one compressed data block by truncating bits from the at least one compressed data block; and
   outputting the at least one bandwidth limited compressed data block to a buffer,
wherein the method further comprises dynamically updating the at least one bandwidth limit applied to the at least one compressed data block based at least partly on a fill level of the buffer and starting from an initial bandwidth limit for the current image, and determining the compression factor for encoding the received image data of the current image into the at least one compressed data block based at least partly on a data rate and a distribution of truncated bits for N previous images in the video data stream.

2. The method of claim 1, wherein dynamically updating the at least one bandwidth limit is further based at least partly on at least one from a group comprising:
   (i) a size of the buffer to which the at least one bandwidth limited compressed data block is output;
   (ii) an egress rate of the buffer to which the at least one bandwidth limited compressed data block is output;
   (iii) the initial bandwidth limit;
   (iv) the data rate distribution of compressed image data for N previous images, where N equals an integer value; and
   (v) the distribution of truncated bits for N previous images.

3. The method of claim 1, wherein the method comprises dynamically reducing the at least one bandwidth limit upon the fill level of the buffer exceeding at least one threshold level.

4. The method of claim 3, wherein the method comprises dynamically reducing the at least one bandwidth limit relative to the initial bandwidth limit by an amount dependent at least partly on by how much the fill level of the buffer exceeds the at least one threshold level.

5. The method of claim 3, wherein the method comprises configuring the at least one threshold level based at least partly on at least one from a group consisting of:
   (i) a size of the buffer to which the at least one bandwidth limited compressed data block is output;
   (ii) an egress rate of the buffer to which the at least one bandwidth limited compressed data block is output; and
   (iii) the initial bandwidth limit.

6. The method of claim 1, wherein the method comprises calculating the initial bandwidth limit to be applied to compressed data blocks for the current image based at least partly on a data rate for at least one previous image.

7. The method of claim 6, wherein the method comprises calculating the initial bandwidth limit for the current image based at least partly on at least one from a group consisting of:
   (i) a data rate distribution of compressed image data for N previous images, where N equals an integer value;
   (ii) a distribution of truncated bits for N previous images; and
   (iii) the compression factor for N previous images.

8. The method of claim 7, wherein the method comprises performing low pass filtering of distribution data for the N previous images used for calculating the initial bandwidth limit.

9. The method of claim 1, wherein the method comprises applying separate bandwidth limits to different image components of the at least one compressed data block.

10. The method of claim 9, wherein the method comprises applying separate bandwidth limits to luma and chroma components of the at least one compressed data block.

11. A method of performing compression of image data for a current image of a video data stream, the method comprising:
   receiving image data of at least part of the current image;
   encoding the received image data into at least one compressed data block in accordance with a compression factor;
   applying at least one bandwidth limit to the at least one compressed data block by truncating bits from the at least one compressed data block; and
   outputting the at least one bandwidth limited compressed data block to a buffer,
   wherein the method further comprises dynamically updating the at least one bandwidth limit by calculating the compression factor for encoding the received image data of the current image into compressed data blocks based at least partly on a data rate and a distribution of truncated bits for each of a plurality of images in the video data stream prior to the current image in the video data stream.

12. The method of claim 11, wherein calculating the compression factor for encoding received image data of the current image into compressed data blocks based at least partly on at least one from a group consisting of:
   (i) a data rate distribution of compressed image data for N previous images, where N equals an integer value; and
   (ii) the compression factor for N previous images.

13. The method of claim 12, wherein the method comprises performing low pass filtering of distribution data for N previous images used for calculating the compression factor for encoding received image data of the current image into compressed data blocks.

14. The method of claim 11, wherein calculating the compression factor for encoding the received image data of the current image is further based on at least one from a group consisting of:
   (i) a size of the buffer to which the at least one bandwidth limited compressed data block is output; and
   (ii) an egress rate of the buffer to which the at least one bandwidth limited compressed data block is output.

15. The method of claim 11, wherein the method for use in a latency sensitive video application.

16. An encoder module comprising:
   an encoding component arranged to receive image data of at least part of a current image of a video data stream, and to encode the received image data into at least one compressed data block in accordance with a compression factor; and
   a bandwidth limiter component arranged to apply at least one bandwidth limit to the at least one compressed data block, and to output the at least one bandwidth limited compressed data block to a buffer,
   wherein the encoder module further comprises a controller component arranged to dynamically update the at least one bandwidth limit applied to the at least one compressed data block based at least partly on a fill level of the buffer and starting from an initial bandwidth limit for the current image, and calculate the compression factor for encoding received image data of the current image into compressed data blocks based at least partly on a data rate and a distribution of truncated bits for each of a plurality of images in the video data stream prior to the current image in the video data stream.

* * * * *